March 2, 1954

C. W. DODD ET AL 2,670,921

BOX FILLER

Filed Dec. 19, 1949

INVENTORS
CARL W. DODD
CARL H. CARL

BY Hans G. Hoffmeister.

ATTORNEY

INVENTORS
CARL W. DODD
CARL H. CARL

BY Hans G. Hoffmeister
ATTORNEY

INVENTORS
CARL W. DODD
CARL H. CARL

March 2, 1954
C. W. DODD ET AL
2,670,921
BOX FILLER
Filed Dec. 19, 1949
6 Sheets-Sheet 4
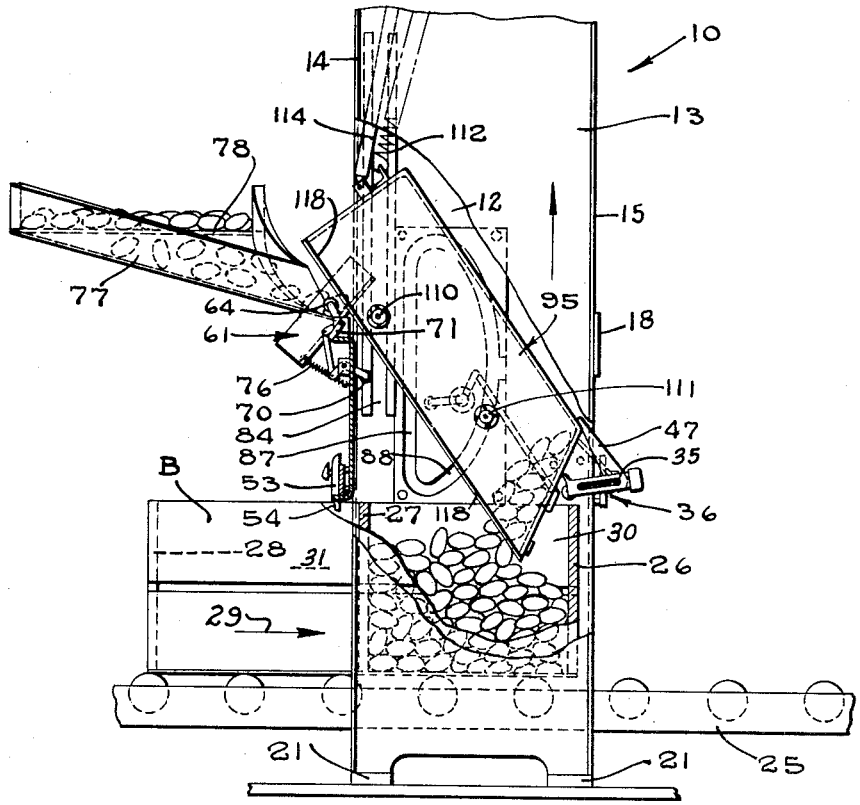
FIG. 4
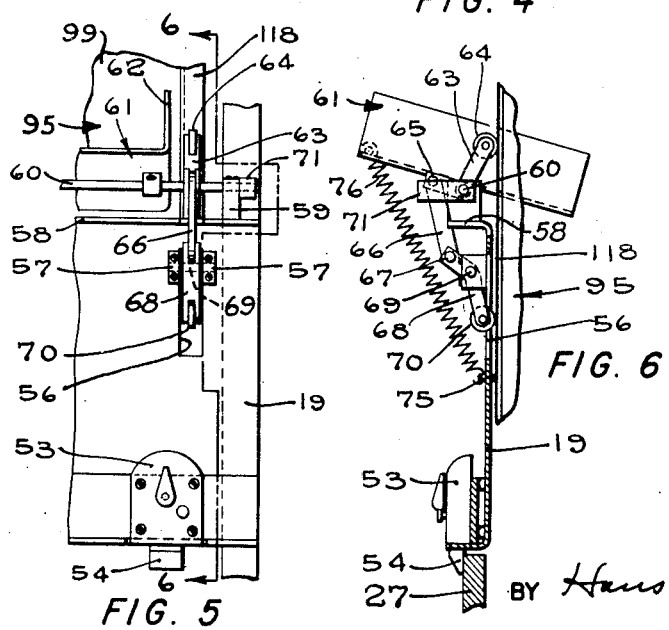
FIG. 5
FIG. 6
INVENTORS
CARL W. DODD
CARL H. CARL
BY Hans G. Hoffmeister
ATTORNEY

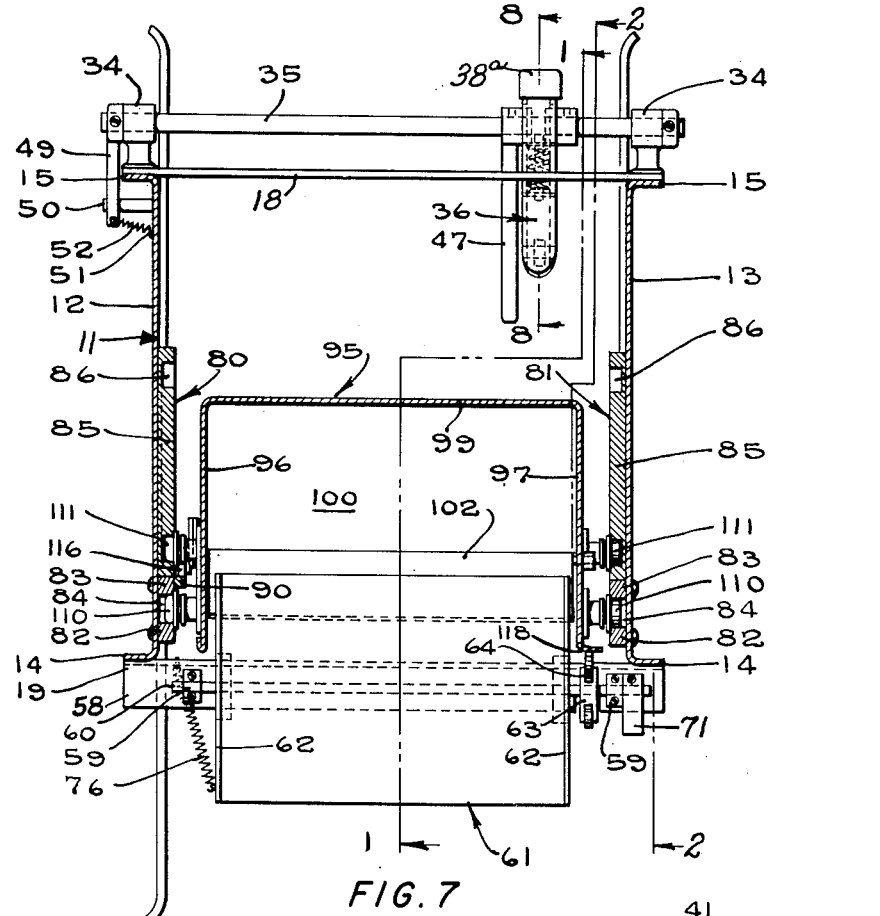
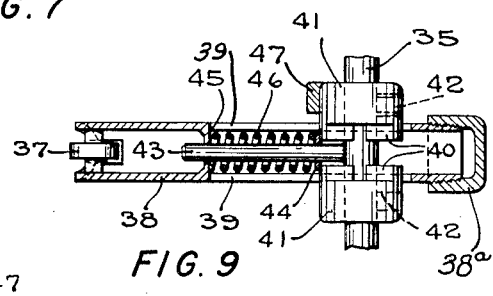
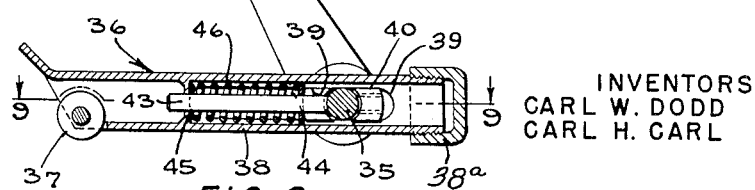

March 2, 1954   C. W. DODD ET AL   2,670,921
BOX FILLER
Filed Dec. 19, 1949   6 Sheets-Sheet 6

INVENTORS
CARL W. DODD
CARL H. CARL

BY Hans G. Hoffmeister
ATTORNEY

Patented Mar. 2, 1954

2,670,921

UNITED STATES PATENT OFFICE 2,670,921

BOX FILLER

Carl W. Dodd, Garden Grove, and Carl H. Carl, Oakland, Calif.

Application December 19, 1949, Serial No. 133,914

12 Claims. (Cl. 249—17)

This invention relates to box fillers and has particular utility in the lemon packing industry in delivering into each half of a lemon box a load of loose lemons.

This application is a continuation in part of our co-pending application Serial No. 73,138 for Fruit and Vegetable Box Filler, filed January 27, 1949, now abandoned.

It is an object of this invention to provide a box filler by which loose material such as whole lemons may be automatically introduced into a box without substantial damage being done to the material.

Another object of the invention is to provide such a box filler which is relatively inexpensive to produce, has a long life, and the cost of maintenance of which is also low.

A further object of the invention is to provide a box filler, the entire functioning of which is effected by the weight of the product handled.

The manner of accomplishing the foregoing objects as well as further objects and advantages will be made manifest in the following description taken in connection with the accompanying drawings, in which:

Fig. 4 is a fragmentary view similar to Fig. 3 and illustrates the bucket of the invention automatically returning upward at the moment when it trips the stop previously holding the box in position beneath the bucket, this being just as the last few pieces of fruit in the bucket are delivered into the box, the delivery of fruit into the bucket still being temporarily halted.

Fig. 5 is an enlarged fragmentary front elevational view of the box filler of the invention taken in the direction of the arrow 5 in Fig. 2.

Fig. 6 is a vertical sectional view taken on the line 6—6 of Fig. 5.

Fig. 7 is an enlarged horizontal sectional view taken on the line 7—7 of Fig. 2.

Fig. 8 is an enlarged vertical sectional view taken on the line 8—8 of Fig. 7, showing the box stop of the invention disposed horizontally.

Fig. 9 is a horizontal sectional view taken on the line 9—9 of Fig. 8.

Figure 1:
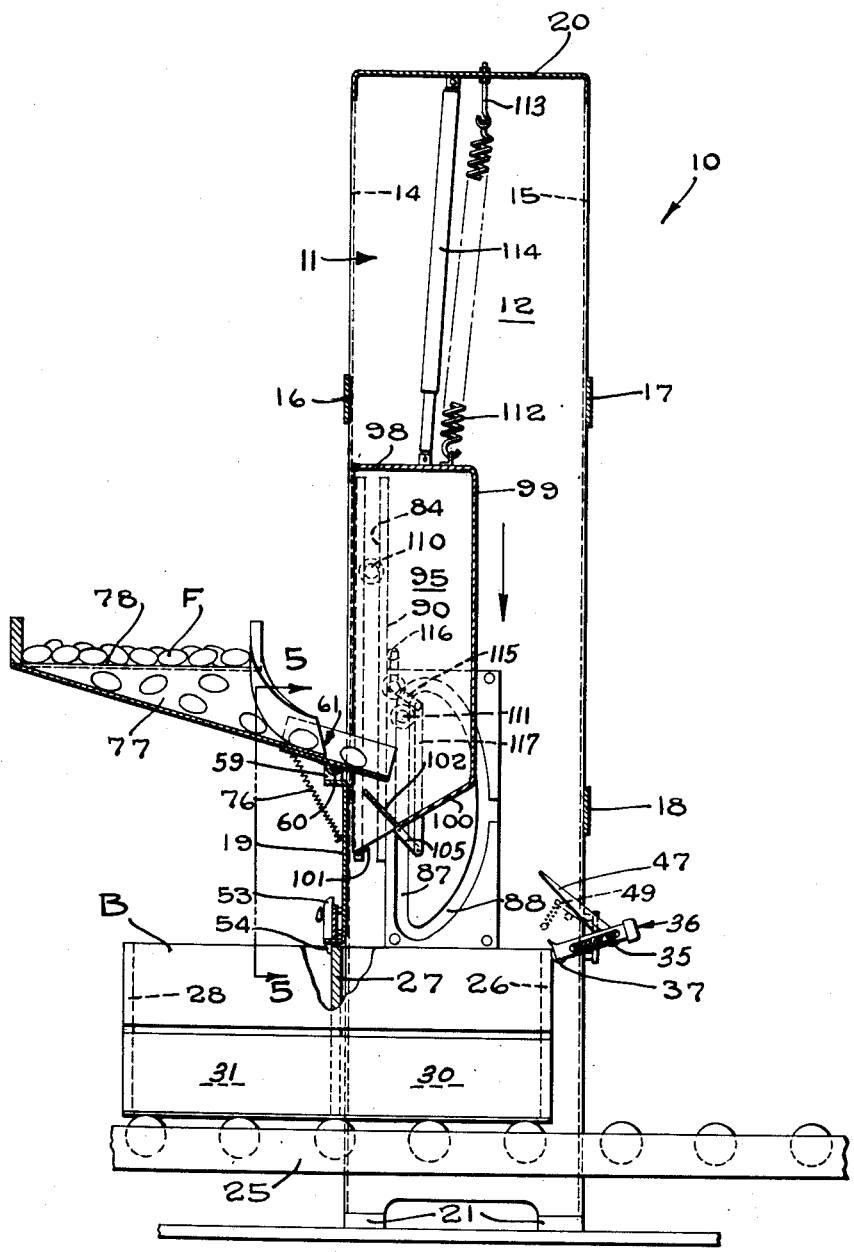
Fig. 1 is a longitudinal vertical sectional view taken on the line 1—1 of Fig. 7, and illustrating a preferred embodiment of the invention with the parts thereof disposed as at the start of a box filling operation.

Referring specifically to the drawings, the box filler 10 disclosed therein includes a frame 11 having sidewalls 12 and 13, having vertical edge flanges 14 and 15 to which are bolted spacer plates 16, 17, and 18, and a short front wall 19. At their upper ends the sidewalls 12 and 13 are connected by a top wall 20. At their lower ends the sidewalls 12 and 13 have lugs 21 by which the frame 11 may be bolted to the floor. Extending between the sidewalls 12 and 13 just above the lugs 21 is a gravity conveyor 25 on which lemon boxes B travel by gravity into and through the filler 10 in the process of being filled.

Each of the boxes B has a front head 26, a middle partition 27, and a rear head 28, considered with respect to the direction (indicated by an arrow 29 in Figure 4) in which the box B progresses through the filler 10 incidental to the front compartment 30 and the rear compartment 31 of the box B being successively filled with fruit.

Journalled in suitable bearings 34 (Figure 7) fixed on the flanges 15 of the sidewalls 12 and 13, is a box-stop shaft 35 (Figures 1, 2, 3, 4 and 7) carrying a box stop 36 which is adapted to engage the box head 26, or partition 27, depending upon whether the compartment 30 or 31 is being filled at the time. Stop 36 includes a roller 37 (Figure 8) which is rotatably mounted on one end of a tube 38 having slots 39 into which bosses 40 extend, these bosses being formed on collars 41 which are fixed as by set screws 42 onto the shaft 35 (Figure 9) and one of which carries a lever arm 47 as shown in Figures 1, 2, 3 and 8. Welded onto the shaft 35 is a rod 43, this extending through a washer 44 and a web 45 formed within the tube 38, there being a compression spring 46 coiled about said rod between said washer and said web so as to yieldably extend stop roller 37 away from the shaft 35. Covering the rear end of the tube 38 is a screw cap 38a.

Shaft 35 also has an arm 49 fixed thereto outside the sidewall 12 (Figure 7). Provided on said wall is a stud 50 and an eye 51, the latter being connected by a spring 52 to arm 49 so as to yieldably hold this arm against the stud 50 which places the stop roller 37 into the path of a box approaching on conveyor 25.

Fixed on the front wall 19 at its lower edge is a spring lock 53 from which a bevelled latch 54 is yieldably extended downwardly into the path of the upper edges of the box heads and partitions (Figures 1, 2, 3 and 4).

Formed in the front wall 19 is a vertical slot 56 on opposite sides of which are provided bearings 57 (Figure 5). Fixed on a flange 58 which is out-bent from the upper edge of the wall 19 are bearings 59 in which a shaft 60 journals. Mounted on this shaft between said bearings is a gate chute 61 which is formed of sheet metal from opposite side edges of which sidewalls 62 are bent upwardly.

Also fixed on shaft 60 is a bell crank 63 which carries a roller 64 and is pivotally connected at 65 with a link 66, the opposite end of the latter pivotally connecting at 67 with a bell crank 68 mounted on a shaft 69 which journals in the aforementioned bearings 57 and carries a roller 70 at its lower extremity. Fastened on one end of shaft 60 is a stop bar 71 (Figures 4, 5 and 7).

Connected at one end to the chute 61 and at its other end to an eye 75 provided in the wall 19 is a contractile spring 76.

Extending into the chute 61 to a point disposed just outwardly from above the axis of shaft 60 is the terminal hopper 77 of a fruit conveyor 78 (Figures 1, 2, 3 and 4).

Secured as by screws to the inner faces of the sidewalls 12 and 13 are cam systems 80 and 81. Cam system 80 includes two square bars 82 and 83 forming a vertical guideway 84. System 80 also includes a plate 85 having a closed semi-elliptical or orbital cam groove 86 formed therein, this groove having a vertical section 87 which is parallel with the guideway 84, and an arcuate section 88 disposed rearwardly from the vertical section and connecting opposite ends of the latter. The cam system 81 is a symmetrical duplicate of those portions of the system 80 described above and is disposed directly opposite the system 80.

Cam system 80 is otherwise distinguished from system 81, however, by including a cam bar 90, the latter being mounted on the inner face of the cam bar 83 and being co-extensive in length therewith (Figure 7). A gentle delivery into the box B of lemons discharged over the gate chute 61 is accomplished by a bucket 95 which is made of sheet metal and has sidewalls 96 and 97, a top wall 98, a back wall 99, and a sloping partial bottom wall 100. Inturned stops 101 are provided on the lower extremities of the sidewalls 96 and 97 (Figures 1, 10 and 11) for limiting the downward movement of a fruit retaining flap 102 which is fixed on a shaft 103, the latter journalling in bearings 104 provided on sidewalls 96 and 97, and having an arm 105 disposed just outside the sidewall 96.

The sidewalls 96 and 97 have upper rollers 110 rotateably mounted thereon which extend laterally from the bucket and into the guideways 84 of the cam systems 80 and 81 (Figure 7). These bucket sidewalls also have rotatably mounted thereon lower rollers 111 which extend into the cam grooves 86 of said cam systems.

The bucket 95 is yieldably supported by coil springs 112, only one of which is shown in the drawings and the opposite ends of which are connected to the bucket back of its center of gravity and to eye bolts 113 secured in the frame top wall 20. Also pivotally connected at its opposite ends to the bucket top wall 98 and to the frame top wall 20 is a dashpot 114, the points of attachment of the dashpot being on the same side of the springs 112 as the center of gravity of the bucket 95.

Pivotally mounted on the outer face of the bucket sidewall 96 is a bell crank 115 (Figures 1, 10 and 11), one arm of which has a roller 116 and the other arm of which is pivotally connected to a link 117, the opposite end of which pivotally connects with the hereinbefore described arm 105.

Figure 2:
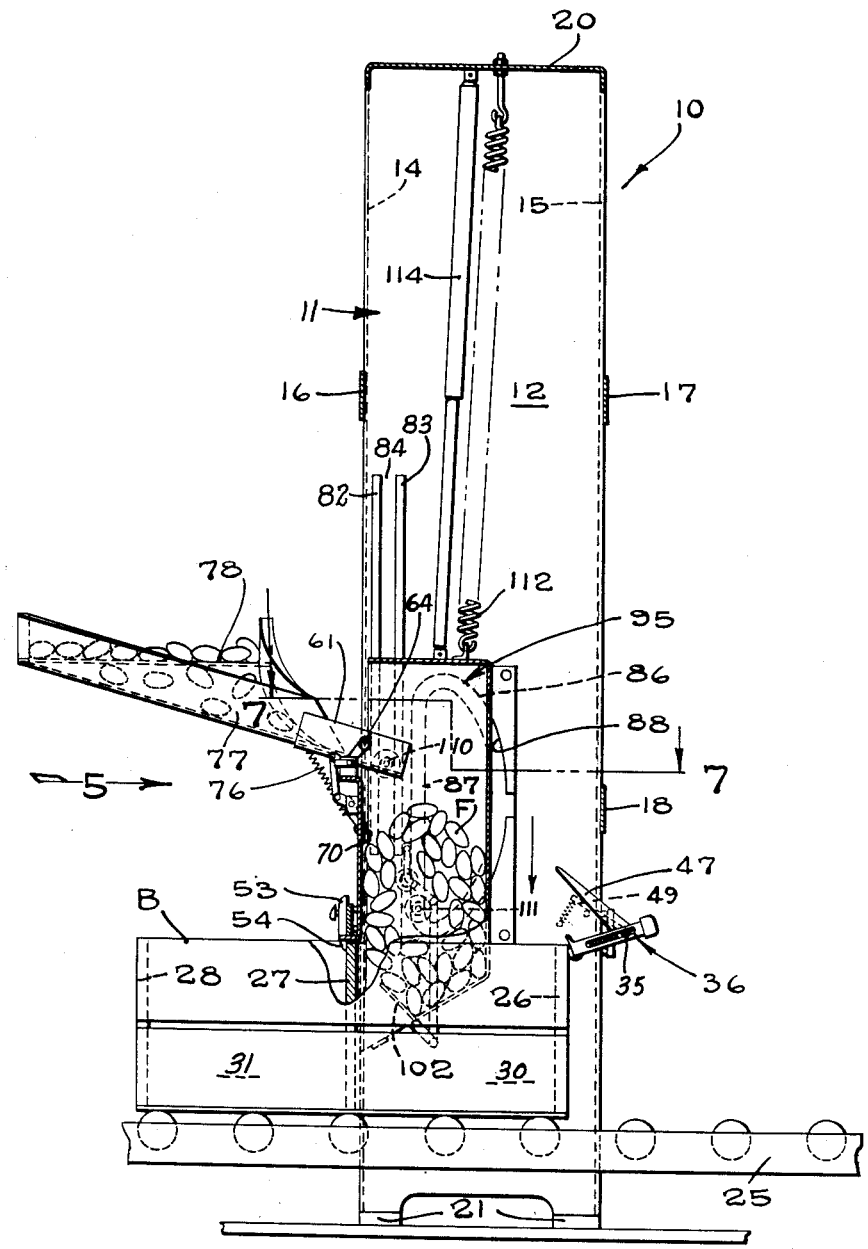
Fig. 2 is a view similar to Fig. 1 (this view being taken on the line 2—2 of Fig. 7) and illustrating the transfer bucket of the invention about three-quarters loaded with fruit so as to extend this bucket downwardly into a lemon box disposed therebeneath.
Figure 10:
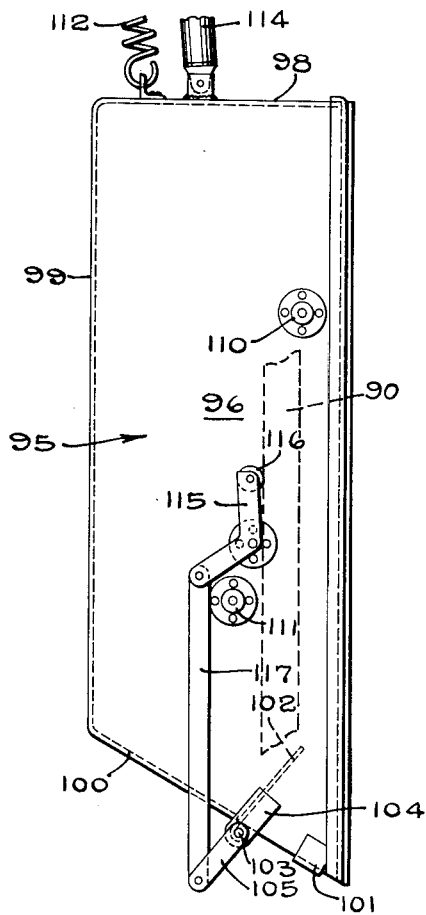
Fig. 10 is an enlarged elevational view of the bucket of the invention removed from the frame thereof and viewed from the side opposite to that shown in Figures 3 and 4 so as to bring into view the means for controlling the fruit retaining flap positioned as for starting a weighing operation.

With the bucket 95 positioned as shown in Figs. 1 and 2 (see also Fig. 7) the roller 116 rides against the rear face of the cam bar 90 (indicated in phantom lines in Figure 10) thereby swinging the flap 102 upwardly into the position in which it is shown in Figs. 1, 2, and 10.

The bucket 95 has a cam flange 118 which is bent outwardly from the forward edge of the sidewall 97 (Figures 5, 6 and 7) and the rollers 64 and 70 are engaged by this cam flange so as to control the delivery of fruit to the bucket 95 through the chute 61 in accordance with the position of the bucket 95.

*Operation*

Each filling cycle starts with a box B positioned either as shown in Fig. 1 with the center partition 27 caught beneath the latch 54, thereby pressing the front box head 26 against the stop roller 37 or with the box B disposed half a length forward from said position with the box head 28 caught beneath the latch 54 and with the stop 37 resting against the box partition 27.

Assuming the box to be positioned as shown in Fig. 1, and that fruit F such as whole lemons are being delivered from the conveyor 78 onto the hopper 77 from which these gravitate across the inclined chute 61 into the bucket 95, the bottom 100 of the bucket 95 is disposed a close distance below the chute 61 with the flap 102 inclined upwardly beneath the chute so that the first fruit delivered into the bucket will be caught in the trough shaped space formed by the bucket bottom 100 and flap 102. This space is large enough to contain enough fruit to cause an extension of the springs 112 which keeps the uppermost surface of the fruit thus accumulating in the bucket below and out of contact with the chute 61. The tension provided by the springs 112, however, is such that the extent to which these yield causes the uppermost surface of the accumulated fruit in the bucket to be disposed closely below the chute 61 throughout the delivery of fruit through said chute into said bucket.

As the fruit thus delivered to the bucket accumulates, the movement of the bucket downward continues notwithstanding a certain amount of friction between said fruit and the front wall 19 which covers that portion of the open side of said bucket which is disposed between the delivery chute 61 and the box B. In this way a load of fruit F of precisely the quantity which it is desired to deliver into the compartments 30 or 31 of the box B accumulates in the bucket 95 while the bucket is still in upright position as shown in Figs. 1 and 2 and the chute 61 is inclined to continue delivering fruit F into the bucket.

Figure 11:
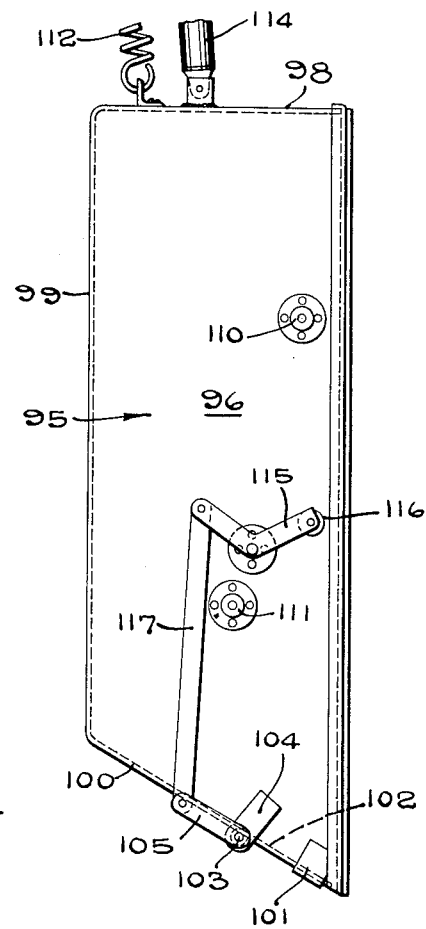
Fig. 11 is a view similar to Fig. 10 illustrating the parts of the bucket positioned as when dumping fruit from the bucket.

When the approximate amount of fruit which it is desired to deliver to each compartment of the box has thus accumulated in the bucket 95, the springs 112 have been thereby elongated to the point where the lower rollers 111 have moved down to the lower ends of the vertical groove sections 87 and into the curved connections of said lower ends with the arcuate sections 88 of the cam grooves 86. The points of attachment of the springs 112 with the bucket 95, being out of alignment with the center of gravity of the loaded bucket, the action of these springs tends to swing the bucket about the rollers 110 away from wall 19. The pressure of the fruit in the bucket 95 against the wall 19 and the box partition 27 at this point in the operation also assists in swinging the bucket 95 away from the wall 19 whereby the rollers 111 pass rapidly from the lower ends of vertical groove sections 87 into the arcuate groove sections 88. As this happens, the roller 116 (Figure 10) travels off the lower end of the cam bar 90 (Figure 3) allowing the flap 102 to swing under the weight of the fruit in the bucket to its downwardly inclined position resting upon stops 101 (Figure 11).

Figure 3:
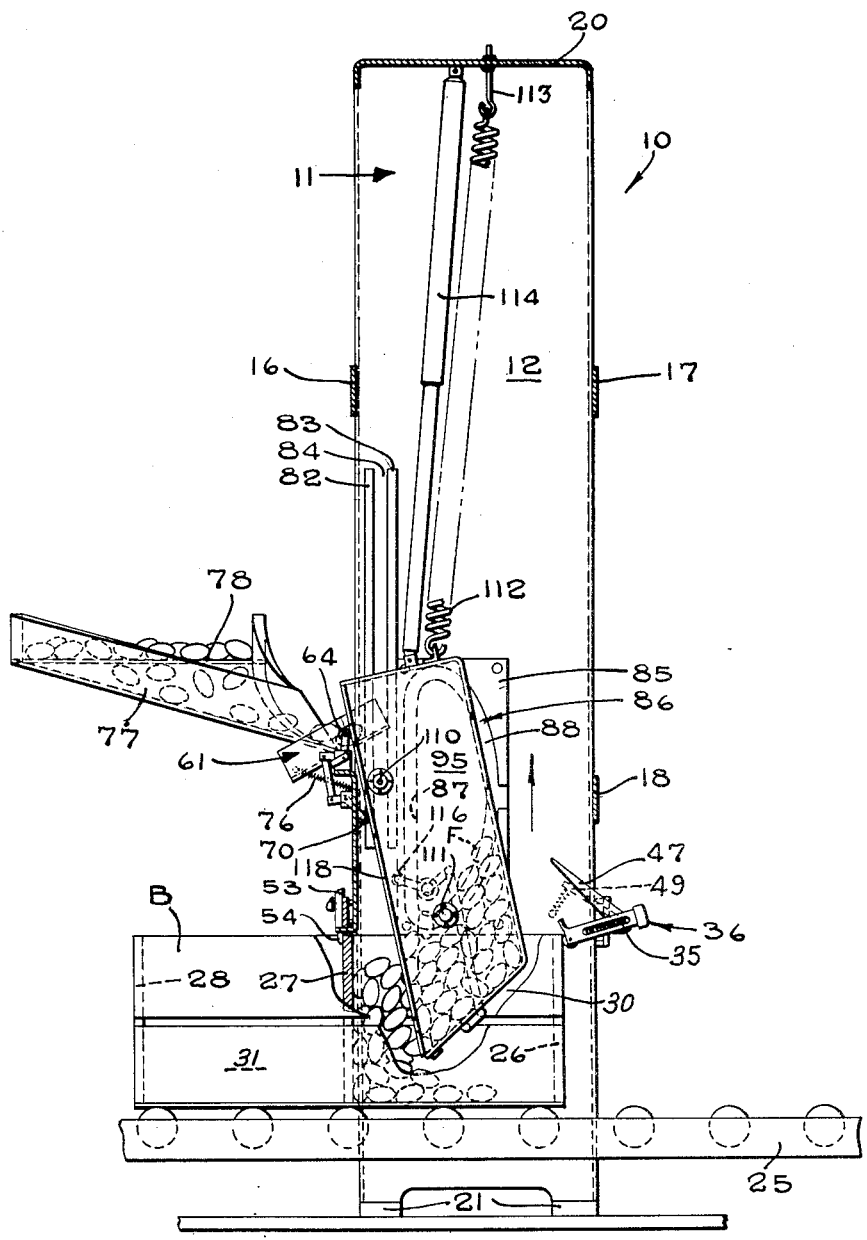
Fig. 3 is a view similar to Fig. 2 showing the bucket of the invention just after it has started dumping its load in the lemon box therebeneath and also showing how this action by the bucket temporarily shuts off the delivery of lemons to the bucket.

Fig. 3 illustrates the resulting rapid flow of fruit F from the bucket 95 into the compartment 30 of the box B, the effect of which flow is coordinated with the lifting action of the springs 112 on the lightened bucket 95 and results in a smooth but swift tilting of the bucket as it ascends through the position in which it is shown in Fig. 4, in which the last few pieces of fruit F are shown as being delivered from the bucket into the box compartment.

Fig. 4 also shows the bucket 95 contacting the stop arm 47, swinging the stop 36 upwardly to release the box B, thereby permitting it to move along the conveyor 25 to reposition the box in the box filler 10 for filling the compartment 31 thereof.

While the bucket 95 is in upright position as shown in Figs. 1 and 2, the feed control rollers 64 and 70 are in engagement with the cam flange 118 with the latter disposed vertically which holds the feed chute 61 inclined downwardly into the bucket 95 so as to transfer fruit into said bucket from the hopper 77 (Figure 6). The tilting of the bucket 95 as shown in Fig. 3 to start dumping the contents of the bucket into the box operates on the rollers 64 and 70 as shown in this view to reversely cock the chute 61 and interrupt the delivery of fruit to the bucket.

This interruption continues throughout the fruit dumping operation, the return of the chute to fruit feeding position taking place as the rollers 111 pass from the upper ends of the arcuate cam sections 88 into vertical sections 87 to reposition the bucket 95 as shown in Fig. 1. As the bucket thus repositions itself, and causes a resumption of the feeding of fruit thereto, the roller 116 which controls the gate flap 102 is again brought into engagement with the cam bar 90 (Figure 10) which swings the flap 102 upwardly as this is shown in Fig. 1.

During a certain period of the upward travel of the bucket 95 the cam flange 113 leaves contact with the rollers 64 and 70 (Figure 4). Until contact is reestablished between the flange 118 and rollers 64 and 70 as the bucket returns to its empty vertical position, (as shown in Fig. 1) the spring 76 retains the chute 61 cocked upwardly as shown in Fig. 4 so that the feeding of fruit to the bucket 95 is not resumed until just as the bucket shifts into the position of readiness to start receiving a new load of fruit as illustrated in Fig. 1.

The dash pot 114 serves to prevent a too rapid response of the bucket 95 to the extended springs 112 during the initial phase of the return movement of the empty bucket. This is necessary to protect the fruit from being damaged by too rapid return of the bucket in this phase of the operation.

The claims are:

1. In a box filler, the combination of: a frame; a bucket vertically guided on said frame, said bucket having an open side; a delivery device extending into said bucket through said open side to deliver loose material into said bucket near the bottom of the latter; spring means yieldably supporting said bucket with a force permitting said bucket to be lowered by the weight of material delivered as aforesaid onto the bottom of said bucket to keep the upper surface of material accumulating in the bottom of said bucket disposed below said delivery device; cover means below said delivery device for closing the portion of said open side of said bucket which is disposed below said delivery device; and means automatically responsive to the descent of said bucket to a given level by the accumulation of said material therein to horizontally separate said bucket and said covering means to permit the downward gravitation of said material from said bucket.

2. In a box filler, the combination of: a frame including spaced sidewalls; a bucket positioned between said walls; a pair of primary guide rollers extending laterally from said bucket; vertical guides on said walls for said primary rollers; a pair of secondary rollers provided on said bucket and extending laterally therefrom; orbital guides on said walls for said secondary rollers; spring means for yieldably supporting said bucket with the latter in upper upright starting position, said bucket being open on one side thereof; a delivery chute pivoted on said frame in a position to deliver loose whole fruit into said bucket through said open side thereof at a point close to the bottom of said bucket when the latter is in said upper position; said spring means supporting said bucket with a flexible force which permits said bucket to descend proportionately to the weight of the material delivered into said bucket to keep the upper surface of the accumulation of said material in said bucket close to but below said delivery chute; a wall beneath said chute for closing a portion of the open side of said bucket disposed below said chute, first portions of said orbital guides engaged by said secondary rollers during said descent of said bucket being substantially parallel with said wall to define a distance along which said bucket is constrained to descend in upright position, and second portions of said orbital guide adjoining said first portions at the lower ends thereof and of a conformation arranged to permit said bucket to swing away from said wall and discharge said material downwardly upon said secondary rollers reaching a given level in the descent of said bucket.

3. A combination as in claim 2 in which the bottom of said bucket is provided with a material retaining flap; means for holding said flap in material retaining position as said bucket descends and for releasing said flap whereby it shifts into material discharging position approximately as said bucket swings away from said wall.

4. A combination as in claim 3 in which means is provided for actuating said chute to temporarily discontinue the feeding of loose material to said bucket, in response to the swinging of said bucket away from said wall, and being effective upon the return of said bucket by said spring means to its starting position to reposition said chute to again feed material as aforesaid into said bucket.

5. In a box filler, the combination of: a bucket disposed in upright position and open at one side; means for yieldably supporting said bucket over a box with the plane of said open side of said bucket close to the inner surface of a vertical wall of said box; means for delivering loose whole fruit through said open side of said bucket and into the latter close to the bottom thereof to cause said bucket to progressively descend into said box as the amount of said fruit accumulates in said bucket; means for closing a portion of said open side of said bucket disposed between said fruit delivery means and said box wall; and means responsive to said bucket descending to a given level to cause said bucket to swing away from said wall of said box and said closure means to effect the delivery of fruit from said bucket into said box, and return upward under the impulse of said yieldable means, to its starting position.

6. A combination as in claim 5, in which said bucket has a fruit retaining bottom flap and means for retaining said flap in fruit retaining position while said bucket is descending and responsive to the final downward movement of said bucket to move said flap to fruit discharging position, said means also being responsive to said bucket returning to its starting position to return said flap to fruit retaining position.

7. A box loading arrangement comprising a bucket having an open side, means yieldably supporting said bucket in an upper position at a point out of vertical alignment with the center of gravity thereof, guide means engaging said bucket and having a vertically extending section to constrain said bucket to substantially vertical downward movement in upright position under the weight of material delivered thereinto and another section leading from the lower end of said first mentioned section in a direction away from the open side of said bucket to permit said yieldable support means, upon descent of said bucket to a predetermined level, to tilt the bucket into a position in which the open side wall thereof faces downwardly.

8. A box loading arrangement comprising a bucket having an open side, spring means yieldably supporting said bucket in an upper position at a point out of vertical alignment with the center of gravity thereof, first substantially vertically extending guide means engaging said bucket at a point on the other side of its center of gravity than the point engaged by said spring means, a second guide means for said bucket having a first section extending parallel to said first guide means to constrain said bucket to substantially vertical downward movement in upright position from said upper position under the weight of material delivered thereinto and a second section leading from the lower end of said first section in a direction away from the open side of said bucket to permit said spring means, upon descent of said bucket to a predetermined level, to tilt the bucket into a position in which the open side thereof faces downwardly.

9. A box loading arrangement comprising a bucket having an open side, spring means yieldably supporting said bucket in an upper position at a point out of vertical alignment with the center of gravity thereof, first vertically extending linear guide means pivotally engaging said bucket at a point on the other side of its center of gravity than the point engaged by said spring means, a second orbital guide means for said bucket having a first section extending parallel to said first guide means to constrain said bucket to vertical descent in upright position during an initial phase of downward movement under the weight of material delivered thereinto and a second section leading from the lower end of said first section on the side remote from the open side of said bucket to the upper end of said first section to permit said spring means upon descent of said bucket to a predetermined level to tilt the bucket into a position in which the open side thereof faces downwardly, and to return the bucket upon discharge of the material contained therein to its initial upper position in upright condition.

10. A box loading arrangement comprising a bucket having an open side, stationary closure means for the open side of said bucket, spring means yieldably supporting said bucket in an upper position at a point out of vertical alignment with the center of gravity thereof, first substantially vertically extending guide means engaging said bucket at a point on the other side of its center of gravity than the point engaged by said spring means, a second guide means for said bucket having a first section extending parallel to said first guide means to constrain said bucket to substantially vertical downward movement in upright position under the weight of material delivered thereinto with its open side held against said closure means and a second section leading from the lower end of said first section in a direction away from the open side of said bucket to permit said spring means, upon descent of said bucket to a predetermined level, to tilt the bucket away from said closure means into a position in which the open side thereof faces downwardly.

11. Arrangement according to claim 7 including a material conveyor, a feed trough pivotally supported between the end of said conveyor and the open side of said bucket, means effective upon disposition of said bucket in upright position to maintain said trough in a downwardly inclined feeding position with its lower end protruding into said bucket through the open side thereof and operable upon tilting of said bucket to swing said trough into an upwardly inclined position in which it blocks the flow of material from the end of said conveyor into said bucket.

12. Arrangement according to claim 7 wherein said bucket has a slanting floor and comprising a lid pivotally supported from said bucket adjacent to, and forming a continuation of, said slanting floor; and means effective upon disposition of said bucket in upright position to tilt said lid upwardly relative to said slanting floor so as to form with said floor a material-retaining trough at the bottom of said bucket.

CARL W. DODD.
CARL H. CARL.

References Cited in the file of this patent

UNITED STATES PATENTS

| Number | Name | Date |
| --- | --- | --- |
| 520,382 | Weber et al. | May 22, 1894 |
| 664,619 | Boggs | Dec. 25, 1900 |
| 1,066,566 | Wortham | July 8, 1913 |
| 1,082,614 | Staaf | Dec. 30, 1913 |
| 1,521,700 | Mitchell | Jan. 6, 1925 |
| 1,881,859 | Mullendore | Oct. 11, 1932 |
| 2,016,443 | Levitre | Oct. 8, 1935 |